United States Patent
Warshaw et al.

[15] 3,683,246
[45] Aug. 8, 1972

[54] SINGLE MOTOR DRIVE OF FORMING WINDER COLLET

[72] Inventors: Saul Warshaw, New York; Arnold J. Eisenberg, East Setaucket; Winton Loveland, Fort Salonga, all of N.Y.

[73] Assignee: The Loveshaw Corporation, Deer Park, L. I., N.Y.

[22] Filed: June 9, 1971

[21] Appl. No.: 151,250

[52] U.S. Cl. .....................318/6, 318/342, 318/442
[51] Int. Cl. ..............................................H02p 5/34
[58] Field of Search......318/4, 6, 105, 106, 109, 110, 318/151, 230, 231, 341, 342, 344, 411, 415, 440, 442, 500, 619

[56] References Cited

UNITED STATES PATENTS

| | | | |
|---|---|---|---|
| 3,527,990 | 9/1970 | Gasser | 318/6 |
| 3,179,863 | 4/1965 | Corey | 318/6 |
| 2,685,055 | 7/1954 | Winther | 318/344 |

*Primary Examiner*—Bernard A. Gilheany
*Assistant Examiner*—W. E. Duncanson, Jr.
*Attorney*—Watson, Leavenworth & Kelton

[57] ABSTRACT

Single motor drive of a rotatable, relatively massive collet in a forming winder which successively cross winds packages of a strand or yarn on the rotating collet. A high-powered motor which is energized by relatively high voltage AC rapidly rotates the collet up to a maximum predetermined speed during an initial period of accelerating action. Then relatively lower voltage AC is substituted for the high voltage AC power to continue the drive of the motor and the collet from the latter during a following period of yarn winding action. The circuitry which supplies the lower voltage AC power includes a relatively economical, lower voltage output, variable frequency AC inverter that includes infinitely variable change speed means to maintain the peripheral speed of the building package substantially uniform. Control circuitry is provided to effect this alternate shift from high power to low power drive of the single motor between the periods of accelerating action and the winding action of the operational cycle. Preferably it includes relay means to hold this control circuitry closed during the operational cycle and simultaneously to hold open a braking circuit that imposes braking action upon the driving motor as power to the latter is cut off at the termination of this cycle.

8 Claims, 5 Drawing Figures

SINGLE MOTOR DRIVE OF FORMING WINDER COLLET

BACKGROUND OF THE INVENTION

The present invention relates to the power drive of a forming winder collet from a single motor.

The present patent application covers an improvement of the power drive disclosed and claimed in our copending patent application for DUAL MOTOR DRIVE OF ROTARY EQUIPMENT WHICH MAY BE A FORMING WINDER TO PACKAGE CONTINUOUS STRAND OR YARN, Ser. No. 137,565, filed Apr. 26, 1971, in which considerable background that is pertinent to the present invention is set forth.

In the prior U.S. Pat. No. 3,070,981 to Frickert; No. 3,254,850 Martin et al.; No. 3,198,444 Moody et al.; and No. 2,622,810 Stream et al. single motor collet drives in forming winders, featuring belt and pulley driving connections between such motors and collets, as well as other common features, are proposed. However, these prior art patents do not propose the single motor drive of the present invention, nor do they indicate an attainment of the advantages realized by the practice of this invention.

SUMMARY OF THE INVENTION

This invention features a single, high-powered, electrical AC motor drive of a relatively massive, rotatable forming winder collet that is very rapidly accelerated to a predetermined high speed while the motor is powered by relatively high voltage AC, and then its rotation is continued for a desired winding action period by the same motor which, during this winding AC is energized by appreciably reduced lower voltage AD power. The electrical energizing circuitry for the single high-powered motor includes two AC supply circuits that are alternatively connectable to the motor field windings. One of these supply circuits may feed to the motor field windings relatively high voltage AC power, e.g., 440v., three-phase, 60 cycle AC, during a short initial acceleration period, and the other may feed thereto relatively lower AC power, e.g., 220v., three-phase, 60 cycle AC, during a following yarn winding period. The lower AC power poser is supplied to the motor field windings as the high voltage AC power is cut off therefrom. The lower voltage AC power is supplied through a variable frequency AC inverter that includes infinitely variable change speed means which dictates during the winding action period gradual deceleration of the rotating collet. A speed sensing means is provided which will dictate such shift from the high voltage AC power to the lower voltage AC power as the accelerating speed of the motor causes the driven collet to rotate at progressively greater speed up to a predetermined maximum. Such speed sensing means may include a signal generator that is driven by this motor to feed back to the inverter current pulses that are directly related in frequency to the rpm of the motor, and current pulse frequency responsive means that are associated with the inverter to effect opening of the high power supply circuit as the initial accelerating speed is brought up to the critical predetermined rate. Control energizing circuitry preferably is provided in which is embodied switch operating means to respond to a signal that is generated by the responsive means at the critical speed, for breaking the high voltage power supply circuit that is connected to the motor and simultaneously connects to the latter the lower voltage power supply circuit.

The applicants had, previous to the present invention, determined that a high powered single motor could be employed rapidly to accelerate such a forming winder collet up to a maximum predetermined speed of 5,000 rpm, or greater as may be required, through a speed step-up pulley and belt driving arrangement. They had also determined that the requirement of gradual deceleration of the collet winding speed during the winding action so as to compensate for the diametrical build-up of the package and maintain a constant package surface or yarn drawing speed could be accomplished by supplying the power throughout the entire accelerating and winding cycle to the single driving motor through a solid state, variable frequency, AC inverter which includes infinitely variable change speed means with the change speed means becoming effective during the winding action portion of the cycle. However, such an inverter must have a power rating many times that of the single motor so as to accommodate the very great current drain of starting up and accelerating. In a typical embodiment employing a dual package winding collet and single motor drive of the physical characteristics indicated hereinafter with respect to the construction illustrated by way of example in the drawings and employing associated electrical equipment proposed, such initial current drain may be 15 to 20 times that of the motor when the latter is started. Thus, when all of the power is supplied to the single motor through such an inverter the latter has to have such a large power rating as to be extremely expensive.

This problem is avoided by the present invention whereby the high-powered single AC motor is powered directly from a relatively high voltage AC supply source during starting and the period of acceleration up to the predetermined maximum speed at which the winding action is to commence, and then for this high voltage source a lower voltage AC supply is substituted which feeds to the motor windings the much lower power requirements through such a variable frequency AC inverter that includes the required infinitely variable change speed means. Speed sensing means that is operated by the single motor dictates opening of switch means in the high voltage AC supply circuit and simultaneously closure of switch means in the lower voltage AC supply circuit, at the time the critical predetermined maximum speed is attained. Preferably, this speed sensing means includes a signal generator which is driven by the single motor and feeds current pulses, that are directly related in frequency to the motor rpm, to current pulse frequency responsive means that is associated with or embodied in the inverter, such as a signal relay, that effects the desired switching of the pair of power supply circuits.

It is desirable that the single motor be provided with electrical braking means to bring it and the collet driven thereby quickly to a stop as the winding action of each operational cycle is completed, and it may be of the type illustrated in our copending patent application, Ser. No. 137,565. Thus the electrical circuit of this braking means may be supplied with DC power from a pair of output terminals of the inverter and include braking circuit switch means that may be manipulated by a brake relay coil that is energized at the beginning of the operational accelerating and winding cycle. Desirably, control energizing circuitry is provided which includes the brake relay coil, as well as relay means which initially connects the motor to the high power AC supply circuit and then effects the alternate shift of connection of the motor to the low power AC output of the inverter in the low power AC supply circuit as the predetermined maximum speed in attained. For convenience, this brake relay coil also may manipulate power supply switch means which will connect the control circuitry to the low power AC supply circuit initially for initiating each operational accelerating and winding cycle and to effect ultimate disconnect thereof for termination of this cycle with simultaneous activation of the braking action.

BRIEF DESCRIPTION OF THE DRAWINGS

Other objects of the invention will in part be obvious and will in part appear from reference to the following detailed description taken in connection with the accompanying drawings, wherein like numerals identify similar parts throughout, and in which.

Figure 1:
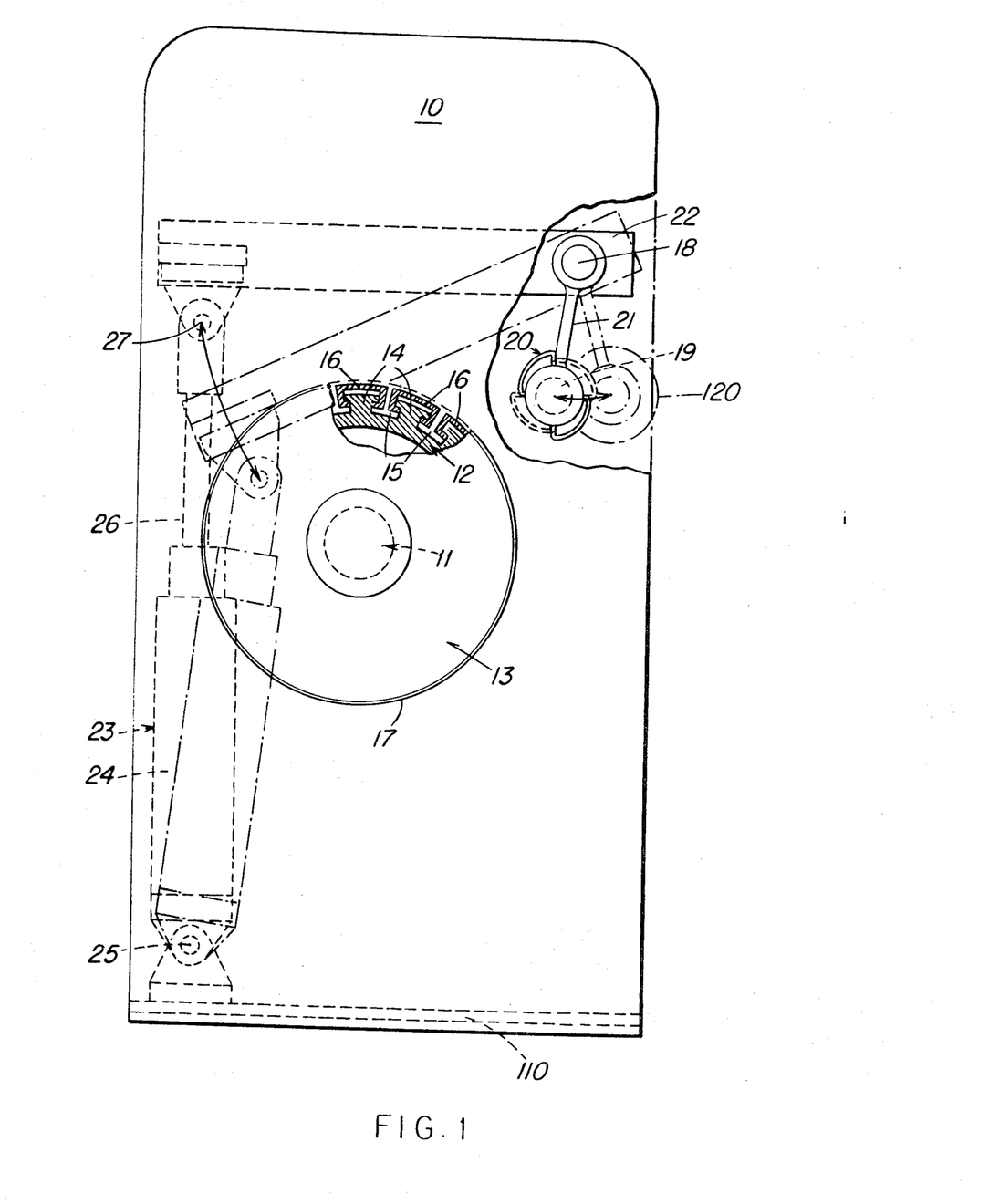
FIG. 1 is a front elevational view of an embodiment of a forming winder which includes a form of the present invention, with parts broken away and in section, depicting the package winding collet that is mounted in front of the face plate thereof and a typical waywinder or traverse which is supported upon a pivotally mounted carriage of the machine that swings out gradually away from the collet after a few turns of the strand or yarn are wrapped initially about a core sleeve or collector tube on the collet, while engaging the strand or yarn for back and forth criss-cross winding upon the tube or sleeve to build up a package.
Figure 2:
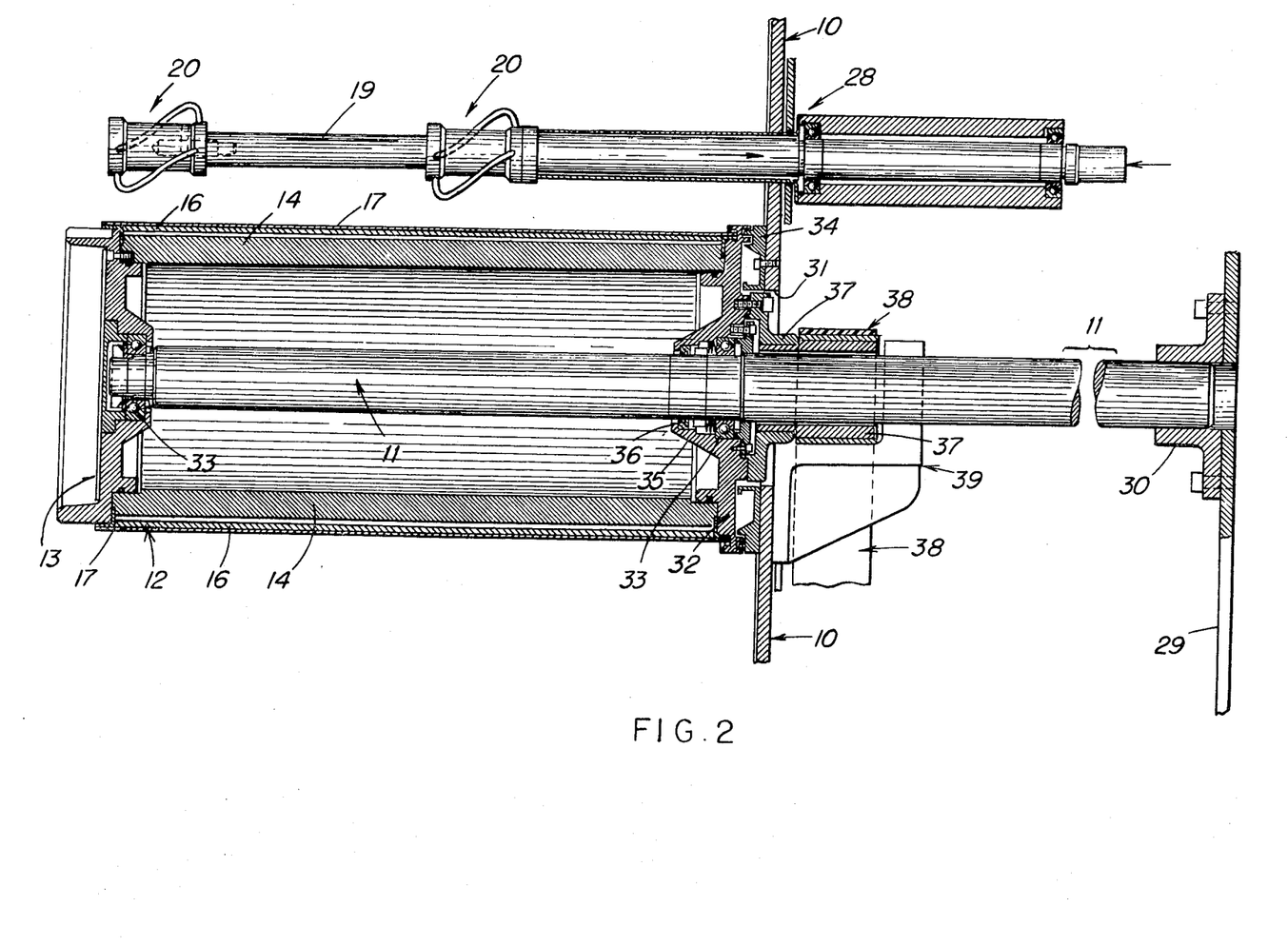
FIG. 2 is a side elevational view, with parts broken away and in section of a forward portion of the forming winder machine of FIG. 1, which illustrates a preferred structure of the collet, its support and drive, as well as the waywinder mechanism which includes a pair of the strand or yarn-guiding, rotary, spiral traverses to be employed simultaneously for building up a pair of packages on the collet at the same time.

As will be seen from FIGS. 1 and 2 the machine frame includes a face plate 10 through which a fixed, non-rotary shaft 11 extends forward to support thereon of a rotatable collet sleeve or shell 12 immediately in front of the face plate. As is shown in FIG. 1 in the broken out portion of the collet front end wall 13, the sleeve or shell 12 preferably is provided with a series of circumferentially spaced, integral, longitudinally extending, T-shaped ribs 14, which define therebetween a plurality of longitudinally extending, inverted T-shaped slots 15. Over each of the T-shaped ribs 14 a plurality of C-shaped, elongated, channel members are slid longitudinally, with their inturned, opposed ends engaged beneath the heads of these ribs and into the slots with appreciable clearance for radial movement in and out. When the collet is not rotated these channel members provide together the outer diametrical surface of the collet which is of minimum diameter to facilitate slide thereover of a collector tube or core sleeve 17, that will be securely clamped thereon by these elongated channel members when thrown out by a centrifugal force during the rotation of the collet.

To the rear side of the face plate 10 suitable carriage structure (not shown) is pivotally mounted about the axis of a longitudinally extending pivot shaft 18 which supports, for swing therewith, a drivable rotary shaft 19 that carries, fixed thereto, at least one conventional strand-guiding transverse 20 which diverts this strand back and traverse into axially warped loops thereof as this strand is being wound up on the core sleeve or collector tube 17 during rotary drive of the collet 12. As will be seen from FIG. 1 a portion of the carriage, which is diagrammatically illustrated as a swinging arm 21, constitutes a support for the driven waywinder shaft 19, and it is swung back gradually to the dot-dash, right hand position 120 during winding, thereafter to be swing forward in the initial portion of the next winding cycle to the full line position for engagement and guidance of the strand during the next winding operation. This carriage structure 21 has fixed thereto a lever arm 22, so that when it is in the horizontal position indicated in FIG. 1 the waywinder spiral 20 and its rotatable shaft 19 are in the full line position, there depicted, but when it is swung downward in a counterclockwise direction this waywinder structure is swing back to the broken line position 120.

Behind the face plate 10 is mounted a hydraulic motor 23 which conventionally may include a cylinder 24 that has a lower end pivotally supported at 25 on frame base structure 110, and houses a reciprocatable piston with the stem 26 thereof extending upwardly to pivotal connection at 27 with the waywinder-swinging lever 22.

It is indicated in FIG. 2 that the waywinder shaft 19 preferably may support a pair of the traverses 20 that are axially spaced thereon, for the purpose of guiding the lay down of a pair of strands or yarns upon a pair of the collector tubes or core sleeves 17 that may be carried by the collet sleeve or shell 12 in a manner similar to that proposed in the Frickert U.S. Pat. No. 3,070,981 and Martin et al. U.S. Pat. No. 3,254,850 patents. For this purpose, the collet sleeve or shell 12 may be about 12 inches O.D. and about 30 inches long. A portion of the carriage which supports the rotated waywinder shaft 19 is indicated in FIG. 2 at 28, and this carriage is to be reciprocated in a direction parallel to the axis of this waywinder shaft by any suitable means, such as a hydraulic motor (not shown), in accordance with well-known practice in this art. Suitable motor and belt drive (not shown) may be employed to rotate the waywinder shaft 19.

As is indicated in the right hand side of FIG. 2 a rear fixed plate 29 of the frame structure of the forming winder has fixedly mounted thereon a ferrule 30 which receives and supports the back end of the fixed collet shaft 11. This shaft extends forward through en enlarged hole 31 in the frame face plate 10 to provide its front end section which supports in a rotatable manner the collet sleeve or shell 12. This collet sleeve or shell 12 is provided with a back end wall disk 32 which cooperates with the front end wall disk 13 to support the collet sleeve or shell 12 by means of a pair of ring bearings 33 for free rotation about this fixed shaft front end section. A suitable fluid-barrier ring 34 may be mounted between the face plate 10 and this collet back end wall disk 32. Hub 35 of the back end wall disk 34 may carry a felt, or other suitable type of, sealing ring 36. The back end wall disk 32 of the collet has fixedly mounted coaxially thereto a projecting driving sleeve 37, which may be in the form of a pulley about which is lapped a driving belt 38. This driving sleeve 37 extends back through the hole 31 in the face plate 10 so that the driving belt 38 may be lapped thereabout behind this face plate.

Figure 3:
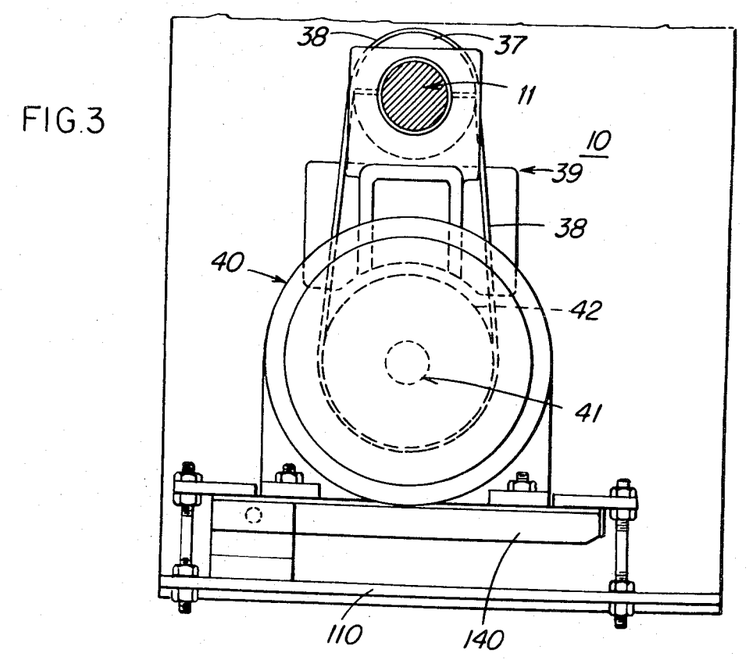
FIG. 3 is an elevational view of the rear side of the face plate, with parts broken away, and the single large motor which is mounted therebehind for drive of the collet sleeve or shell.

In order to minimize or substantially eliminate any tendency for vibration of this mount of the collet, during high speed rotation thereof, particularly in view of the length of the fixed shaft 11, the great overhand of the collet and the mass of the latter and the packages being wound thereon, this fixed shaft 11 is stabilized by a bracket 39 which is fixedly mounted to the rear side of the face plate 10, as will be understood from FIGS. 2 and 3. This bracket 39 is of a size and shape as to avoid interference with the driving belt 38.

Figure 4:
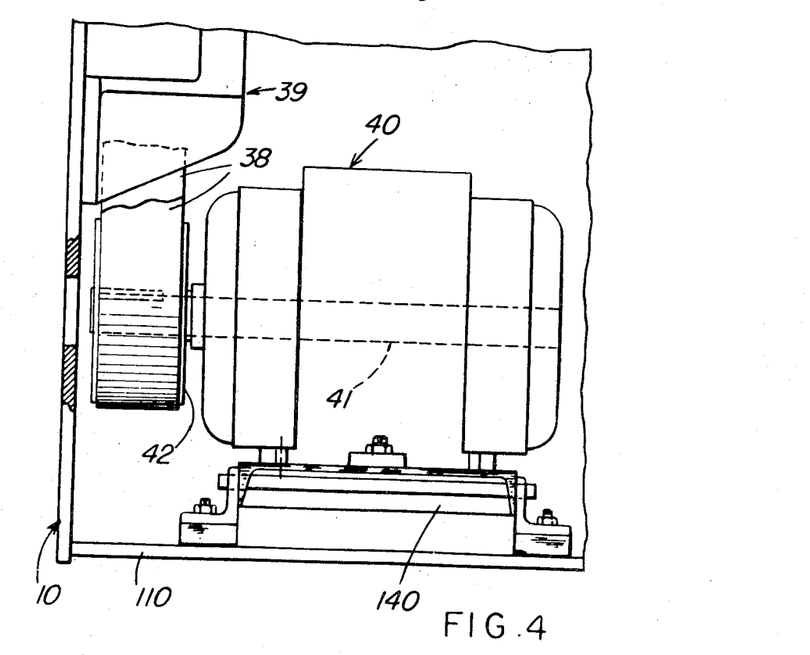
FIG. 4 is a side elevational view, with parts broken away, of the single large motor shown in FIG. 3 which is employed in this forming winder in accordance with the present invention.

As has been previously indicated, and as appears in the appended claims, the power drive of this collet structure by means of the pulley sleeve 37 is performed by a single large motor 40. The large motor 40 has a driving shaft 41 that carries, fixed thereon, a driving pulley 42 about which the driving belt 38 is lapped (see FIGS. 3 and 4). This large motor 40 preferably is an induction, three-phase AC motor which can be powered from conventional 60 cycle electrical power which is usually installed in domestic factory buildings. When such a motor is of the two-pole per phase type it can be driven a maximum of 3,600 rpm, but it is now desired in the present state of this art to rotate the collet at 5,000 rmp upwards. Thus the ratio of the diameters of the driving pulley 42 and the driven pulley 37, about which the driving belt 38 is lapped, may be readily chosen to attain a desired high speed rotation of the collet structure 12. Due to the massiveness of this collet structure, in order for it to be accelerated up to such a predetermined maximum speed, the large AC motor 40 should have a horsepower of about 10-15 hp., in order to accomplish this desired acceleration in a very short time, e.g., in about 10 sec. or less.

After the speed of the massive collet structure 12 has been accelerated to the predetermined maximum high speed it takes relatively little driving horsepower to maintain its rotation in a high speed range during the winding action so as to overcome the winding resistance and other losses attendant upon the winding of strands of fiber glass filaments. It has now been found, in accordance with the present invention, that this may be economically accomplished by reducing the voltage of the AC power that is supplied to the windings of the motor 40 at the time the acceleration of the collet 12 has reached the critical maximum speed. Conventional package winding practice dictates that as this critical maximum speed is attained the winding action is to start for laying down about the rotating core tube of the successive courses of the strand or yarn being drawn, in criss-cross patterns, and that as the package is built up gradually to increase its diametrical size the speed of drive be progressively decelerated to maintain a substantially constant speed of drafting of the strand or yarn for uniform attenuation thereof. Thus the lower voltage AC power which is employed to drive this single large motor desirably should be supplied through a suitable variable frequency AC inverter that includes infinitely variable speed change means. A solid state inverter of this type to accomplish this purpose at the appreciably reduced power for driving the collet during this winding action is very much less costly than such an inverter which matches the horsepower of the high power motor and suitably accommodates the enormous current drain which occurs during starting if the power supply for the motor is supplied through such an inverter throughout the operational accelerating and winding cycle. Suitable electrical circuitry for accomplishing this purpose is illustrated, by way of example, in FIG. 5, and the merits thereof are hereinafter explained in connection therewith.

Figure 5:
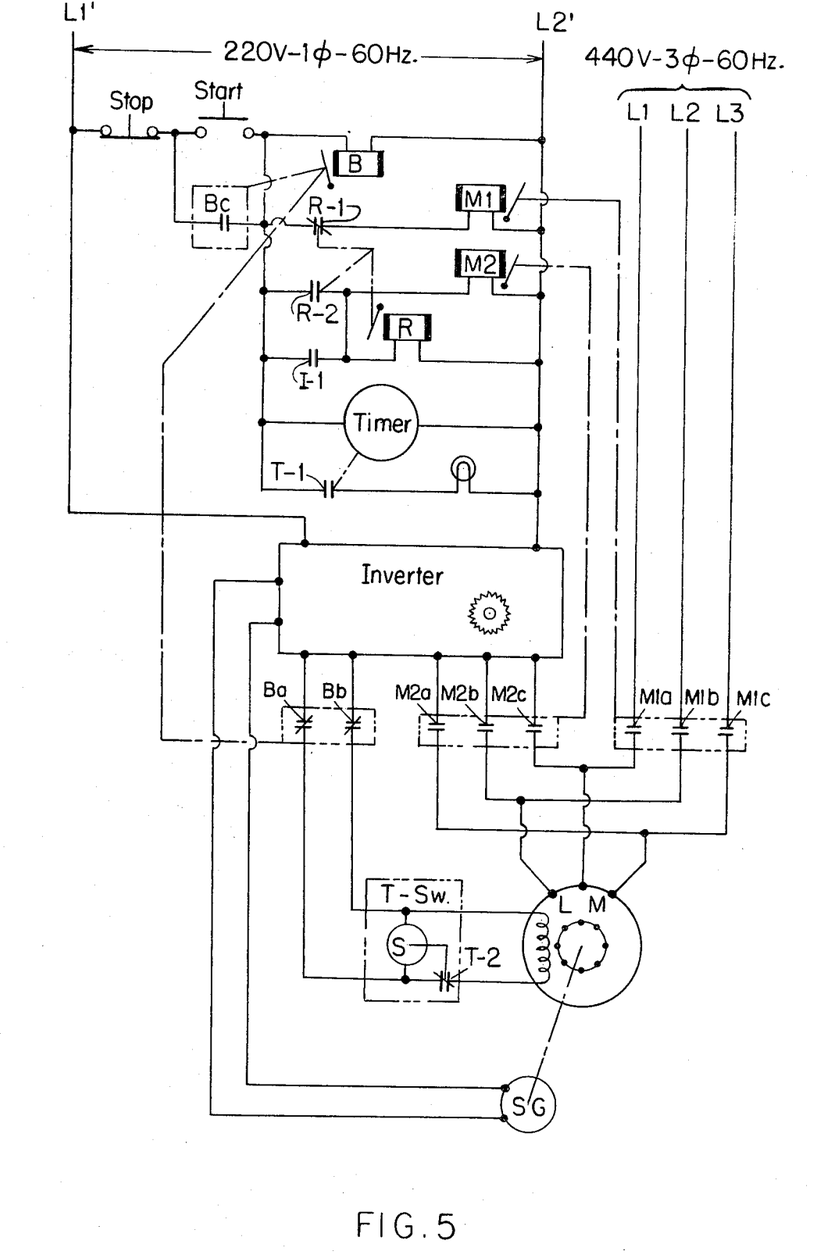
FIG. 5 is a schematic wiring diagram of an embodiment of the present invention.

The electrical energizing and control circuitry, illustrated in FIG. 5, includes, by way of example, a three-phase, two-pole, 440v. 15 hp. induction motor "LM", at 40, having a rotor 50. The three-phase field windings of the motor 40 are respectively connected at 51, 52, and 53 to power supply lines "L1", "L2", and "L3" of a conventional 440v., three-phase, 60 cycle AC, three-phase, relatively high power supply cable through a master switch (not shown) and a bank 54 of normally open switches "M1a", "M1b", and "M1c" of a conventional motor starter. A relatively low voltage AC power supply is also provided which, by way of example, may be 220v., single-phase, 60 cycle AC having supply conductors 55 and 56, which lead respectively to input terminals 57 and 58 of a suitable AC to AC and DC inverter 59, for energizing circuitry of the latter, and which has a speed or output frequency control knob 60. This inverter 59 preferably is of the solid state, variable frequency type for powering AC motors, and includes infinitely variable change speed equipment. It has a relatively low power rating and one such device is obtainable as a 3 hp., solid state, variable frequency AC drive unit, obtainable from 2. Mahwah, New Jersey, as Model No. 2247-3.

The manual control knob 60 may be manipulated to set a frequency comparator in this inverter for dictating a predetermined high speed at which the motor 40 is to be disconnected at the bank 54 of motor starter switches from the relatively high voltage supply source, for simultaneous connection thereto of the relatively low voltage power supply source as the AC output of the inverter 59. AC output terminals 61, 62, and 63 of the inverter 59 are respectively connected to junctions 51, 52, and 53 of the high power supply source through a bank 64 of normally open relay switches "M2a", "M2b", and "M2c".

Conductors 55 and 56 of the lower voltage supply source are bridged between points 65 and 66 by a bridge or branch which includes in series a normally closed "Stop" switch 67, a normally open "Start" switch 68, and a relay coil "B", at 69. The normally open "Start" switch, at 68, is shunted by a normally open holding switch "Bc", at 70, so that when the "Start" switch is normally closed the relay coil "B" is energized to cause its armature to close this holding switch and maintain it closed so long as this relay coil is energized.

Between the points 65 and 58 a control energizing circuitry is provided which includes the bridge or branch in which is embodied the "Stop" and "Start" switches 67 and 68, and the relay coil "B", at 69. Another bridge or branch circuit 71 of this control circuitry includes in series, at 72, a normally closed switch "R–1" and a relay coil "M1", at 73. The relay coil "M1" may be that of a conventional motor starter which includes the bank 54 of normally open switches "M1a", "M1b", and "M1c" for alternatively closing and opening the high voltage power supply circuit that is connected to the field windings of the drive motor 40. Another bridge or branch circuit 74 of the control circuitry includes in series, at 75, a normally open switch "R–2", and a second relay coil "M2", at 76. The relay coil "M2" is mechanically connected to, for manipulation of, the bank 64 of low voltage power supply controlling, normally open switches "M2a", "M2b", and "M2c", which together may comprise a second motor starter unit. A further bridge or branch circuit 77 of the control circuitry includes in series a relay coil "R", at 78, and a normally closed switch "I–1", at 79, of a speed sensing, signal relay that is physically located within the casing of the inverter 59. The bridge circuits 74 and 77 are cross-connected by a conductor 80, which is respectively connected thereto between the normally open switch "R–2" and relay coil "M2", and between the normally open signal relay switch "I–1" and relay coil "R". This cross-connection is important when the normally open signal relay switch "I–1" is of a type to be only momentarily closed when the signal relay in the inverter responds to current pulses at a frequency indicative of the attainment of the predetermined maximum speed.

The speed sensing means, which includes such a signal relay in the inverter 59, embodies a conventional tachometer generator "SG" at 81, which is coupled to, for drive by, the rotor 50 of the motor 40, and output terminals 82 and 83 of this signal generator are respectively connected by conductors 84 and 85 to input terminals 86 and 87 of the inverter 59, for feed to the signal relay in the latter of current pulses that are directly related in frequency to the rpm of the drive motor 40. Thus the signal relay embodied in the inverter constitutes a part of current pulse frequency responsive means which, together with its signal relay switch "I–1", the relay coil "R" and its switches "R–1" and "R–2", effects opening of the motor starter bank of switches 54 and simultaneous closure of the second bank of switches 64, as will be more fully explained later. This signal generator and such current pulse frequency responsive means together constitute generally a speed sensing means.

The control energizing circuitry also includes a bridge or branch 88 which contains a manually adjustable, electrical "Timer", at 89, which may include a small AC synchronous 60 cycle motor to be energized for running simultaneously as either of the relay coils "M1" and "M2" is energized. This timer 89 is shunted by a conductor 90 which contains in series a normally open switch "T–1", at 91, that is closed by the timer at the end of a pre-set time, and a visual or audible signal 92.

The inverter 59 also has a pair of DC output terminals 93 and 94 to which conductors 95 and 96 are respectively connected, with these conductors including a bank 97 of normally closed relay switches "Ba" and "Bb". These conductors 95 and 96 lead to a brake winding 98 of the drive motor 40 for supply thereto of DC braking current. The brake winding 98 preferably is a separate winding that is provided in the drive motor 40. When the relay coil "B", at 69, is energized it effects manipulative opening of the normally closed braking circuit switches "Ba" and "Bb" at the same time as it closes the holding switch "Bc", at 70, and this occurs at the same time that the motor starter coil "M1", at 73 is energized through the normally closed relay switch "R–1" to effect closure of the normally open power supply bank 54 of motor starter switches "M1a–". Such braking relay coil "B" continues to be energized throughout the entire operational accelerating and winding cycle, i.e., until the time when the second power supply circuit is broken by opening of the bank 64 of motor starter switches "M2a–c" upon the concurrent de-energization of the second motor starter relay coil "M2".

It is desirable to avoid any excessive heating of the brake winding 98 of the drive motor 40 during any prolonged periods of energization of the inverter 59 and simultaneous closure of the braking circuit switches "Ba" and "Bb", that may be accomplished by opening the braking circuit 95–98 a relatively short period of time after it had been closed at the switches "Ba" and "Bb" by the de-energization of relay "B" upon opening of the "STOP" button switch 67. This opening of the braking circuit may be performed in any suitable manner, e.g., by a time delays relay switch "T–Sw.", at 99, which may be of known construction that is available on the market. This relay 99 includes a coil "S", indicated at 100, that is shunted across the braking circuit leads 95 and 96 for energization of this coil, and arranged to provide the desired delayed opening of the associated normally closed switch "T–2", at 101, in known manner, e.g., about 15–20 secs., after this coil is energized. Continued energization of the time delay relay coil 100 will hold open the braking circuit 95–98 until this circuit is opened at the normally closed relay switches "Ba" and "Bb" by manipulation of the latter to open position upon re-energization of the relay coil "B" at 69, as the succeeding closure of the "START" push button switch at 68 is effected for initiating the next cycle of operation of the equipment that is driven by the single motor 40. This opening of the braking circuit at switches "Ba" and "Bb" permits reset of the time delay device "T–Sw.", at 99, by allowing its normally closed switch 101 to reclose, for recycling the braking operation.

By way of example, a typical operation of the forming winder described above and as illustrated in the drawings for exemplary purposes, may consist of the following sequence of actions. While the machine is at rest the master supply switch (not shown) will be closed by the operator to supply relatively high, 440v., three-phase, 60 cycles, AC power to supply lines "L1", "L2", and "L3", as well as another master supply switch (not shown) to supply relatively low, 220v., single-phase, 60 cycles, AC power to supply lines "L" and "L"; so as to energize the inverter 59 through conductors 55 and 56. The manual control knob 60 of this inverter will be pre-set, as dictated by the initial speed of the rotation of the collet required for the particular operation to be performed. He then places successively a pair of core or collector tubes 17 upon the collet 12 and depresses a foot switch which effects closure of the "Start" switch, at 68, for energizing the motor starter magnetic coil "M1", at 73, to be energized through the normally closed relay switch "R-1", at 72, thereby to close the normally open motor starter switches "M1a-c", at 54 for energizing the motor 40. The motor 40 drives the collet through its belt and pulley drive with rapid acceleration up to the predetermined maximum speed. As the operator so closes the "Start" switch he manually guides the ends of a pair of strands onto regions of the collet beyond the ends of the pair of empty core tubes that are being rotated with the collet 12, and continues this manual guidance until the latter has been quickly accelerated, e.g., in perhaps less than 10 sec., to the predetermined high speed winding range. The rotating rotor 50 of the motor 40 drives therewith the signal generator "SG", at 81, which will deliver, for example, one pulse of current for each revolution of the motor rotor. When this predetermined high speed is attained the signal relay in the inverter 59 responds momentarily to close the signal relay switch "I-1", at 79, so as to energize the relay coil "R", at 78, and cause it to manipulate its normally closed circuit switch "R-1", at 72, to open position and to close its normally open switch "R-2", at 75. Opening of the normally closed switch "R-1" causes the motor starter coil "M1" to be de-energized for opening the motor starter switches "M1a-" for cutting off the high voltage supply to the motor windings through conductors "L1", "L2", and "L3". Simultaneously the closure of the manipulating relay switch "R-2" effects energization of the second motor starter coil "M2", so as to cause the latter to close its normally open switches "M2a-c", for supply to the motor windings of the relatively lower voltage AC power supply source, so as to continue drive of the motor rotor by the lower voltage AC power which is supplied through the inverter 59. At this time the operator manually guides the strands into engagement with the rotating and reciprocating strand waywinder traverse spirals, which are in their inward positions 20 of FIG. 1, whereby these drawn strands are wound up progressively in the known criss-cross fashion upon the pair of rotating core tubes progressively to build up the pair of packages with gradual retraction of the traverse spirals toward their package-completion positions at 120. The shunt or cross connection 80 between the branches 74 and 77 also causes the energization of the second motor starter coil "M2" simultaneously with that of the manipulating relay coil "R" as the signal relay switch "I-1" was momentarily closed, with the consequent closure of the switch "R-2" then serving as a holding switch to maintain the energization of the relay coil "M2" throughout the winding action period of the operational accelerating and winding cycle. During this winding of the packages the inverter 59 automatically gradually reduces the speed of the rotor 50 of the drive motor by frequency control to compensate for the build-up of the packages by maintaining uniform draw speed of the strands for attaining desired uniform attenuations thereof. While this package winding action is being performed the operator may then move on to another machine for starting its operation in a similar fashion.

Upon completion of the winding up of this pair of packages the pre-set timer 89 closes the signal switch "T-1", at 91, so that the energized signal 92 advises the operator of "call down", causing him then to stop this winder by momentarily opening the "Stop" switch 67. As a consequence, the coil of the relay "B", at 69, becomes de-energized to permit its holding switch "Bc," at 70, to open. Thus, the second motor starter coil "M2", at 76, and the manipulating relay coil "R", at 78, become de-energized with consequent termination of supply of power to the single drive motor 40. At the same time that the bank of power supply switches "M2a-" are thus permitted to open again by this de-energization of the second motor starter coil "M2" the timer, at 89, becomes de-energized again to permit its switch "T-1" to open, so as to disable the visual signal 92, and the deenergization of the brake relay coil "B", at 69, permits the brake circuit switches "Ba" and "Bb" again to close, with the latter causing energization of the drive motor braking coil 98 through the now closed time delay switch "T-2", at 101, to bring the collet rapidly and smoothly to a stop. The operator then doffs the so-formed full packages, slides onto the collet 12 another pair of core tubes 17 and then initiates the succeeding operational cycle of the machine in the same manner, the energization of the inverter being maintained between these cycles due to the supply of low voltage power thereto through the conductors 55 and 56.

It will be seen from FIG. 5 that the motor starter relay coil "M1", at 73, which constitutes a first major relay coil, is in series with the normally closed relay switch "R-1", at 72, and that the second major relay coil "M2", at 76, is in series with the normally open relay switch "R-2", at 75. These series connections are located respectively in separate control energizing circuitry branches or bridges 71 and 74, as shown. It is also indicated therein that the relay coil "R", at 78, of the manipulating relay is located in series with the signal relay switch "I-1", at 79, in another bridge or branch 77 of this control circuitry, and that the shunt or cross connection 80 respectively places the relay switch "R-2" in series with the manipulating relay coil "R" and the signal relay switch "I-1" in series with the second relay coil "M2". As has been previously indicated, this cross connection 80 causes the relay coils "M2" and "R" to be energized initially simultaneously by closure of the signal relay switch "I-1", and that the resultant closure of the manipulating relay switch "R-2" causes the latter to serve as a holding switch for both of the relay coils "M2" and "R" when signal relay switch "I-1" opens. It is thus believed to be apparent that a similar result may be obtained by connecting the relay coils "M2" and "R" directly in series in the branch 74, beyond the connection thereto of the shunt or cross connection 80, with the relay switches "I-1" and "R-2" connected in parallel with respect to each other. Also, a like result may be obtained by omitting the manipulating relay coil "R" from such relocation in branch 74 and entirely from the control circuitry, and to employ the relay coil "M2" for operating the bank 64 of normally open, second motor energizing circuit switches "M2a–c" and the manipulating relay switches "R–1" and "R–2" simultaneously by having these five switches all mechanically coupled together. In this latter control circuitry variant, as the signal relay switch "I–1" is closed momentarily the second relay coil "M2" is energized to close the normally open switch "R–2" for causing it to serve as a holding switch, the second motor energizing circuit switches "M2a–c" are closed and held closed by the continued energization of relay coil "M2", and simultaneously the normally closed relay switch "R–1" is opened and held open to de-energize the motor starter coil "M1" and keep the latter de-energized for permitting the motor starter switches "M1a–c" to reopen and remain open during the remainder of the cycle of operation of the forming winder.

One reason for possibly preferring the circuitry of FIG. 5 is that motor starter units are readily available in complete operative form, so that the second relay "M2" and its normally open switches "M2a–c" may be obtained as such and simply connected into this circuitry without alteration, while the service of the manipulating relay "R" and its switches "R–1" and "R–2" may be more economically and easily realized by obtaining it as a separate standarized device and connecting it into the circuitry as such.

It will thus be seen that the objects set forth above, among those made apparent from the preceding description are efficiently attained and, since certain changes may be made in the above construction without departing from the scope of the invention, it is intended that all matter contained in the above description or shown in the accompanying drawings shall be interpreted as illustrative and not in a limiting sense.

Having described out invention, what we claim as new and desire to secure by Letters Patent is the novel subjects matter defined in the following claims.

We claim:

1. A single motor drive of a relatively massive rotatable collet in a strand or yarn forming winder comprising
   1. a relatively high-powered AC electric motor drivably connected to said collet for accelerating the latter up to a predetermined maximum speed in a relatively short period of time and having electrical input terminals;
   2. a first electrical energizing circuit connectable to a relatively high voltage AC power source and connected to said input terminals for initial supply of such power to said motor, said circuit containing a relay type of motor starter including a magnetic coil and a first set of normally open switch means manipulated by said coil for selectively closing and opening this circuit periodically to supply the relatively high voltage AC power to said motor during an initial speed accelerating action period;
   3. a second electrical energizing circuit connectable to a relatively lower voltage AC power source and containing a lower voltage output, variable frequency AC inverter that includes infinitely variable change speed means, with said inverter having AC output terminals connected to said motor input terminals through a second set of normally open switch means manipulatable by a second relay magnetic coil for selective supply to said motor through said second set of switch means of lower voltage AC power during a following period of strand or yarn winding action after attainment of the accelerated speed limit, the successive initial speed accelerating action and following winding action together constituting an operational accelerating and winding cycle; and
   4. speed sensing means operated by said motor to dictate opening of said motor starter switch means for discontinuing supply of the high voltage AC power to said motor as the latter increases the speed of the driven collet to this speed limit, and simultaneously to dictate closure of said second relay switch means for supply of the lower voltage AC power to said motor during the winding action with progressive deceleration of said collet.

2. The apparatus as defined in claim 1 characterized by said speed sensing means including a signal generator which is driven by said motor and feeds to said inverter current pulses that are directly related in frequency to the rpm of said motor.

3. The apparatus as defined in claim 2 characterized by said speed sensing means including a current pulse frequency responsive means associated with said inverter which effects opening of said motor starter switch means upon attainment of the accelerated speed limit.

4. The apparatus as defined in claim 3 characterized by relay means in said current pulse frequency responsive means which effects the opening of said motor starter switch means at the critical speed limit.

5. The apparatus as defined in claim 4 characterized by the provision of control energizing circuitry including parallel branches with a first one of said branches containing said motor starter magnetic coil in series with a normally closed switch and a second one of said branches containing said second relay magnetic coil in series with a normally open switch, said relay means in said current pulse frequency responsive means being a signal relay which causes said first branch normally closed switch to open and said second branch normally open switch to close at the critical speed limit.

6. The apparatus as defined in claim 5 characterized by means coupling together said first branch normally closed switch and said second branch normally open switch for simultaneous manipulation, said control energizing circuitry embodying manipulating relay means which responds to said signal relay to effect the respective opening and closing of said coupled switches.

7. The apparatus as defined in claim 6 characterized by said signal relay having a normally open switch which is in series with the magnetic coil of said manipulating relay means whereby closure of said signal relay switch upon attainment of the critical speed limit causes the manipulation of said coupled switches.

8. The apparatus as defined in claim 1 characterized by the provision of an electrical braking circuit including a braking coil in said motor, and switch means connecting this braking circuit to the lower voltage AC power source; control energizing circuitry connected to said second electrical energizing circuit and containing the motor starter coil, the second relay coil and a brake relay coil with the latter controlling operation of said braking circuit switch means to hold open the latter throughout the operational accelerating and winding cycle and then to close this braking switch means upon termination of supply of AC power to said motor through said second circuit; and a control circuitry switch closable by said brake relay coil at the beginning of the operational cycle and openable thereby at the termination of the latter as said braking switch means is closed.

* * * * *

UNITED STATES PATENT OFFICE
CERTIFICATE OF CORRECTION

Patent No. 3,683,246    Dated August 8, 1972

Inventor(s) Saul Warshaw, Arnold J. Eisenberg, Winton Loveland

It is certified that error appears in the above-identified patent and that said Letters Patent are hereby corrected as shown below:

Column 1, line 36, for "AD" read --AC--; line 45, strike out "poser"; column 3, line 10, for "in" read --is--; column 4, line 17, for "transverse" read --traverse--; line 18, for "traverse" read --forth--; line 26, for "swing" read --swung--; line 34, for "swing" read --swung--; column 5, line 22, for "overhand" read --overhang--; column 6, line 48, for "2." read --Ramsey Controls,--; line 49, for "-3" read ---2--; column 8, line 20, for "M1a-" read --M1a-c--; column 9, lines 2 and 3, for ""L" and "L";" read --"L1'" and "L2'";--; line 36, for ""M1a-"" read --"M1a-c"--; column 10, line 19, for ""M2a-"" read --"M2a-c"--; column 11, line 38, for "out" read --our--.

Signed and sealed this 20th day of March 1973.

(SEAL)
Attest:

EDWARD M. FLETCHER, JR.
Attesting Officer

ROBERT GOTTSCHALK
Commissioner of Patents